(12) United States Patent
Harrington

(10) Patent No.: US 6,252,580 B1
(45) Date of Patent: Jun. 26, 2001

(54) MAPPING HIGHLIGHT COLORS TO BLACK-AND-WHITE TEXTURES

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/112,955

(22) Filed: Jul. 9, 1998

(51) Int. Cl.[7] ................................................. G09G 3/36
(52) U.S. Cl. ..................... 345/150; 345/431; 345/199; 345/22; 345/152; 345/88; 345/89
(58) Field of Search ............................ 345/150, 151, 345/152, 153, 429, 430, 431

(56) References Cited

U.S. PATENT DOCUMENTS 5,153,576 * 10/1992 Harrington ........................ 340/793
5,237,517   8/1993 Harrington et al. .
5,701,401  12/1997 Harrington et al. .

* cited by examiner

Primary Examiner—Matthew Luu
Assistant Examiner—Daniel J Chung
(74) Attorney, Agent, or Firm—Fay, Sharpe, Fagan, Minnich & McKee, LLP

(57) ABSTRACT

A method for mapping highlight colors to monochromatic textures is provided. It includes reading an input highlight color having a highlight color amount and a base color amount. The highlight color amount is measured and the base color amount is measured. A halftone cell (50) is defined having a plurality of output regions with corresponding output states. The output states of all the output regions are controlled in response to the measured base color amount. The output state of at least one but less than all the output regions is controlled in response to the measured highlight color amount such that the output state of at least one but less than all of the output regions is controlled by both the measured base color amount and the measured highlight color amount.

17 Claims, 3 Drawing Sheets

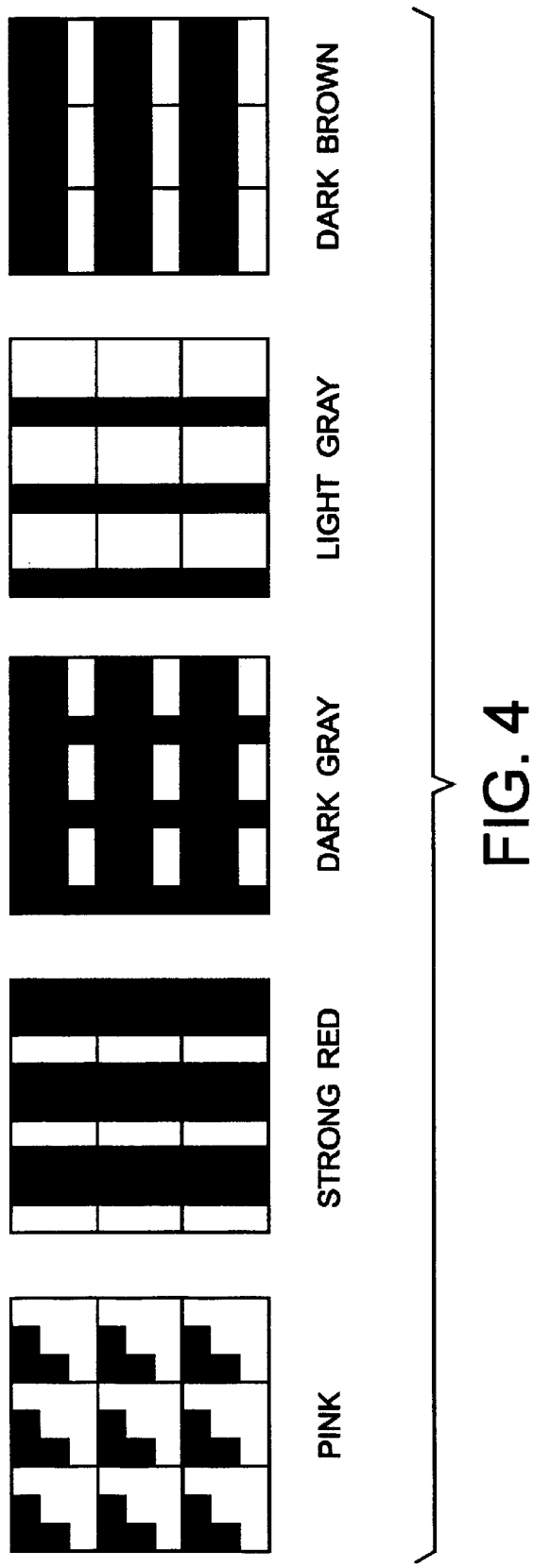

MAPPING HIGHLIGHT COLORS TO BLACK-AND-WHITE TEXTURES

BACKGROUND OF THE INVENTION

The present invention relates to the art of image processing. It finds particular application in conjunction with black-and-white or monochromatic digital printers, and will be described with particular reference thereto. However, it is to be appreciated that the present invention is also amenable to other like applications.

Mapping full color images to black-and-white allows rendering of the full color image without the associated costs of color processing. That is to say, generally, monochromatic or black-and-white reproduction or rendering is faster and more economical than full color. Additionally, color processing may not always be available. Likewise, it is advantageous to be able to map highlight color images, such as those produced by the Xerox 4850 Highlight Color Printer, to black-and-white or an otherwise monochromatic scheme. A highlight color image generally represents a full color image which has been mapped down to two colors, for example using the technique of commonly assigned U.S. Pat. No. 5,237,517, incorporated herein by reference. Images rendered in a highlight color scheme are typically portrayed by two color separations, a highlight color (usually a primary color) and a base color (usually black or white).

However, it is still important to retain, as much as possible, the information one desires to communicate with the rendered image. For pictorial images, such as photographs, much of the information is in the luminance, and gray scale halftoning techniques work well. However, for presentation graphics, such as charts and graphs, much of the information is found in the hue or color rather than the luminance, and while light colors look light, and dark colors look dark, very different colors (e.g. light blue and green) can have the same luminance level and be indistinguishable when mapped to a gray level. For such images, it is advantageous to map different colors to different black-and-white textured patterns that represent those different hues to preserve the information contained in the different hues used in the image.

The commonly assigned U.S. Pat. No. 5,153,576, incorporated herein by reference, describes a method for automatically generating textured patterns from full color images represented in a red-green-blue (RGB) color space. The full color to texture scheme preserves luminance information and performs the mapping function by dividing a halftone cell into three distinct and separate regions exclusively responsive to corresponding color separations, and allocating the size of the three regions of the halftone cell in proportion to the luminance of the red, green, and blue primary colors. In the RGB color space a white color is produced by full intensity values of all three color separations. With this method, a corresponding white will be printed in response to a white input since each separation will cause its separate region of the cell to print white and therefore the whole cell prints white.

However, the method described in the 5,153,576 patent is not suited to mapping from highlight color schemes to black-and-white textures. The most obvious difference between highlight color and full color is the number of color coordinates. Full color has three and highlight color has two. One approach to handling the difference might be to simply divide the halftone cell into only two regions rather than three. However, this presents a further problem. White and black are both indicated by the presence of no highlight color and all or none of the base color. Therefore, accurate mappings that preserve black and/or white are not achieved when the halftone cell is divided into regions under the exclusive control of one of the color coordinates. For example, with a black base color, black is represented by no highlight and full base color. The output however with the two exclusive regions method would by gray. The region under the control of the highlight color would have zero output because no highlight color was indicated, while the region under the control of the base color would have a full output. The overall output result for the halftone cell is a partial output or gray.

The present invention contemplates a new and improved mapping technique, which overcomes the above-referenced problems and others.

SUMMARY OF THE INVENTION

In accordance with one aspect of the present invention, a method for mapping highlight colors to monochromatic textures is provided. It includes reading an input highlight color having a highlight color amount and a base color amount. The highlight color amount and the base color amount are measured. A halftone cell is defined having a plurality of output regions with corresponding output states. The output states of all the output regions are controlled in response to the measured base color amount. The output state of at least one but less than all the output regions are controlled in response to the measured highlight color amount such that the output state of at least one but less than all the output regions is controlled by both the measured base color amount and the measured highlight color amount.

In accordance with a more limited aspect of the present invention, the halftone cell has a first output region and a second output region arranged such that the output states of both the first and second output regions are controlled in response to the measured base color amount and only the output state of the second output region is controlled in response to the measured highlight color amount.

In accordance with a more limited aspect of the present invention, the method further includes dividing each output region into a threshold array having a plurality of elements with individual outputs. Base thresholds and highlight thresholds are set for each element. The individual outputs of each element are determined in response to the measured base and highlight color amounts as compared to the base and highlight thresholds, respectively, such that the individual outputs for the plurality of elements of each output region define the output state for each output region.

In accordance with a more limited aspect of the present invention, the individual outputs are binary.

In accordance with a more limited aspect of the present invention, the individual outputs are selected from a group consisting of black and white.

In accordance with a more limited aspect of the present invention, elements in output regions that do not have their output state controlled in response to the measured highlight color amount have their highlight thresholds set so that no measured highlight color amount possibly reaches their highlight thresholds.

In accordance with a more limited aspect of the present invention, the base thresholds are set such that the base thresholds of elements in output regions that do not have their output state controlled in response to the measured highlight color amount are reached by the measured base color amount prior to the measured base color amount reaching the base thresholds of elements in output regions that have their output state controlled in response to the measured highlight color amount.

In accordance with a more limited aspect of the present invention, in output regions that have their output state controlled in response to both the measured base and highlight color amounts, elements having progressively lower base threshold values have progressively higher highlight threshold values.

In accordance with a more limited aspect of the present invention, the method further includes determining the luminance of the highlight color. The output regions that have their output states controlled in response to the measured highlight color amount are allocated such that a fractional area of the halftone cell covered thereby is proportional to one of the luminance of the highlight color and its complement.

In accordance with a more limited aspect of the present invention, the base color is selected from a group consisting of black and white.

In accordance with another aspect of the present invention, an image processing system is provided. It includes an image input terminal which reads an image portrayed in a highlight color scheme defined by two colors including a highlight color and a base color. An image processing unit receives the image from the image input terminal, maps the highlight color scheme to a black-and-white textured scheme, and supplies the image portrayed in the black-and-white textured scheme. An image output terminal renders the image in the black-and-white textured scheme.

In accordance with a more limited aspect of the present invention, luminance information present in the image at the image input terminal is maintained at the image output terminal.

In accordance with a more limited aspect of the present invention, the image processing unit further includes detectors for detecting amounts of the highlight and base colors in the image. A halftoning processor uses a halftone cell to control mapping in response to detected amounts of the highlight and base colors. The halftoning cell includes a first region responsive to detected amounts of the base color. The first region covers all of the halftone cell. The halftone cell also includes a second region responsive to detected amounts of the highlight color. The second region overlaps the first region and covers a fraction of the halftone cell.

In accordance with a more limited aspect of the present invention, the base color is selected from a group consisting of black and white.

In accordance with a more limited aspect of the present invention, the highlight color has a luminance which luminance has a complement. The second region is arranged such that when the base color is white, the fraction of the halftone cell covered by the second region is proportional to the luminance of the highlight color. When the base color is black, the fraction of the halftone cell covered by the second region is proportional to the complement of the luminance of the highlight color.

In accordance with a more limited aspect of the present invention, the halftone cell is divided into a threshold array having a plurality of elements. The elements each have a highlight threshold and a base threshold which the halftoning processor compares to the detected amounts of the highlight and base colors, respectively, to determine an output for each of the elements.

In accordance with a more limited aspect of the present invention, the elements inside the first region and outside the second region have highlight thresholds set higher than any possible detected amount of highlight color.

In accordance with a more limited aspect of the present invention, the elements inside the second region have base thresholds higher than the base thresholds of elements outside the second region.

In accordance with a more limited aspect of the present invention, the highlight and base thresholds are set such that for any two elements inside the second region, the element having the lower highlight threshold also has the higher base threshold.

In accordance with a more limited aspect of the present invention, the image output terminal is a black-and-white digital printer.

One advantage of the present invention is that it provides high-quality, efficient mapping from highlight color schemes to a black-and-white textured scheme.

Another advantage of the present invention is that it allows input images portrayed with two color separations to be rendered on monochromatic output devices.

Another advantage of the present invention is that luminance information present in the input image is maintained at the output.

Another advantage of the present invention is that a full black input color maps to a full black output color and a full white input color maps to a full white output color.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figures 1, 2:
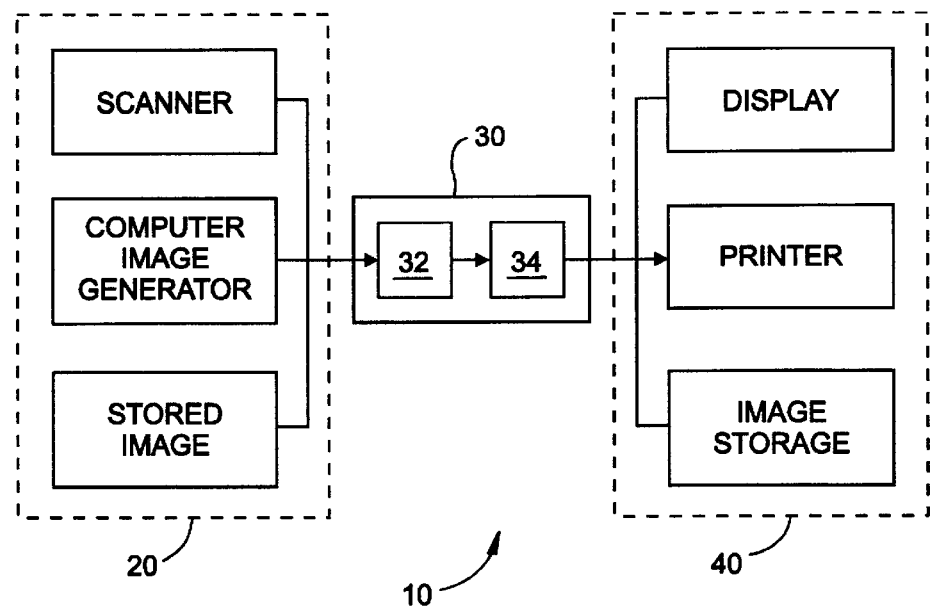
FIG. 1 is a diagrammatic illustration of an image processing system in accordance with aspects of the present invention.
FIG. 2 is a diagrammatic illustration of a halftone cell divided into a threshold array in accordance with aspects of the present invention.

With reference to FIG. 1, an image processing system 10 employs an image input terminal 20 to read or otherwise receive an input image portrayed in a highlight color scheme. The image input terminal 20 optionally includes one or more suitable image input devices such as an electronically or otherwise stored image reader, a computer image generator, a scanner, or the like. In a preferred embodiment, the highlight color scheme of the input image is defined by two color separations: one being the highlight color, and the other being the base color. In a preferred embodiment, the highlight color is optionally a primary color such as red, green, blue, cyan, yellow, or magenta or another appropriate color, and the base color is black or white. Alternately, any two color combinations are employed. Moreover, each of the various highlight colors has a characteristic luminance, which, in turn, has a complement.

An image processing unit 30 receives the input image from the image input terminal 20. The image processing unit 30 maps the highlight color scheme to a black-and-white or otherwise monochromatic textured scheme while maintaining luminance information present in the input image. An image output terminal 40 receives the image from the image processing unit 30 and renders the image in the textured scheme. The rendered image is representative of the input image and contains luminance information present in the input image. Optionally, the a image output terminal 40 includes one or more appropriate rendering engines such as an image storage device, a digital printer, a display, or the like. In a preferred embodiment, the output image is rendered in a black-and-white textured color scheme. Alternately, the image is rendered monochromatically in other than black-and-white, for example on an amber or phosphorous color monochromatic monitor or display. In a preferred embodiment, the image output terminal is a black-and-white digital printer.

Returning attention to the image processing unit 30, the amounts or densities of the highlight and base colors for each spacial division or sampling of the input image are measured, detected, or otherwise determined by the image processing unit 30 via a measuring device 32 including components such as circuitry, detectors, sensors, and the like. The measured amounts of highlight and base color correspond to a relatively large yet limited set or range of values representative thereof. In the illustrated examples (see FIGS. 2–4), the range of values is represented by a single byte and extents between 0 corresponding to the lowest possible measured amount (i.e. none) and 255 corresponding to the highest possible measured amount. However, this range is merely exemplary and in practice any appropriate range is employed as desired for various applications.

With reference to FIG. 2 and continuing reference to FIG. 1, a halftoning processor 34, part of the image processing unit 30, uses a halftone cell 50 to control the mapping function of the image processing unit in response to measured or detected amounts of the highlight and base colors. The halftone cell 50 has a plurality of output regions with corresponding output states. The output states of each region and ultimately the whole halftone cell 50 are textured patterns wherein different textured patterns represent various combinations of measured amounts of highlight and base colors. The whole (i.e. all of the output regions) of the halftone cell 50 is controlled in response to the measured base color amount while only a portion (i.e. at least one but less than all of the output regions) of the halftone cell 50 is controlled in response to the measure highlight color amount.

Figure 3A:
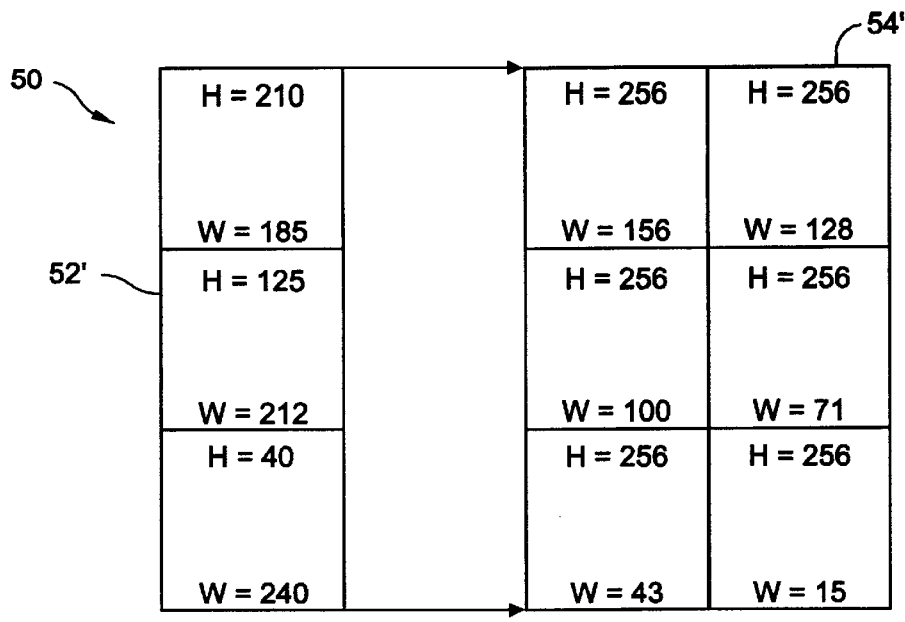
FIGS. 3A and 3B are diagrammatic illustrations showing output regions for the halftone cell in accordance with aspects of the present invention; and, FIG. 4 is a diagrammatic illustration showing examples of output textured patterns in accordance with aspects of the present invention.
Figure 3B:
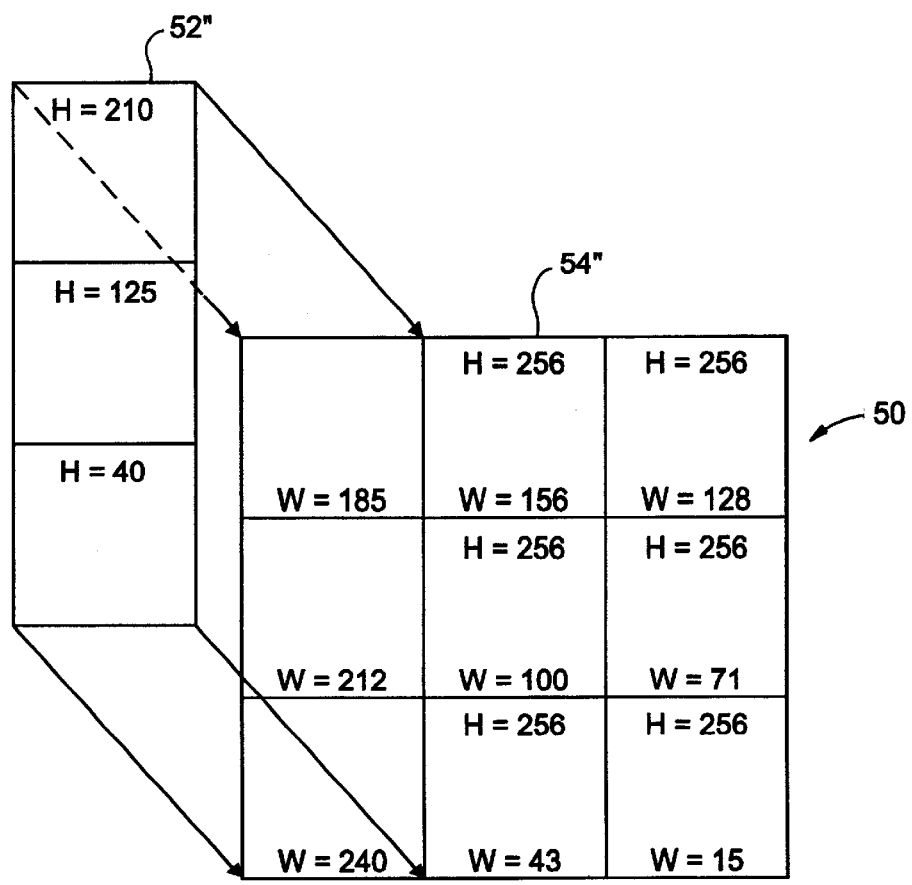

With reference to FIGS. 3A and 3B and continuing reference to FIGS. 1 and 2, in a preferred embodiment, the halftone cell 50 includes two regions. These two regions may be conceptualized in two different ways. They may be considered as two completely separate regions 52' and 54' which combine to make up the entire halftone cell 50 (as shown in FIG. 3A), or they may be considered as a first region 54" which covers the entire halftone cell 50 and a second region 52" which covers a fractional area of the halftone cell 50 (as shown in FIG. 3B). In the latter case, the second region 52" overlaps the first region 54". In either case, the end result is ultimately the same. The whole of the halftone cell 50 is controlled in response to the measured base color amount while some portion less than the whole of the halftone cell 50 is controlled in response to both the measured highlight and base color amounts.

With particular reference to FIG. 3A, the region 52' is responsive to both the measured base and highlight color amounts. The region 54' is responsive solely to the measured base color amount. Therefore, when considered in combination side by side, the result is that the whole halftone cell 50 define by the sum of the two regions 52' and 54' falls under the control of and is responsive to the measured base color amount while only that portion defined by region 52' falls under the control of and is responsive to both the measured highlight and base color amounts.

With particular reference to FIG. 3B, the region 52" is responsive to the measured highlight color amount. The region 54" is responsive to the measured base color amount. Therefore, when considered in overlapping combination, the result is that the whole halftone cell 50 which is defined by region 54" falls under control of and is responsive to the measured base color amount while only that portion where the two regions overlap defined by region 52" falls under the control of and is responsive to both the measured highlight and base color amounts.

In either case, in a preferred embodiment, when the base color is white, the fractional area of the halftone cell 50 that is affected by the measured highlight color amount is allocated in proportion to the luminance of the highlight color. On the other hand, when the base color is black, the fractional area of the halftone cell 50 that is affected by the measured highlight color amount is proportional to the complement of the luminance of the highlight color. In this manner, luminance information in the input image is maintained at the output.

More specifically, the halftone cell 50 is divided into a two dimensional threshold array having a plurality of elements $e_{i,j}$ where i indexes the element's row and j indexes the element's column. For simplification purposes in describing the present invention, the example illustrates a nine element threshold array. However, in practice the array is preferably a larger pattern. Each element $e_{i,j}$ has a set base threshold W and a set highlight threshold H. The individual outputs of each element $e_{i,j}$ are separately determined by comparing the measured amounts of base and highlight color to the set base and highlight thresholds respectively for that element $e_{i,j}$. Moreover, each element $e_{i,j}$ falls into the plurality of regions of the halftone cell 50 and the individual outputs of each element $e_{i,j}$ in each region define the output state for that region such that the textured pattern, in the regions and ultimately in the halftone cell 50, corresponds to the pattern created by the separate individual outputs of the elements $e_{i,j}$.

In a preferred embodiment, the individual outputs of each element $e_{i,j}$ are binary, namely black or white.

The individual output (i.e. black or white) of each element $e_{i,j}$ is determined by whether or not either of the base or highlight thresholds, W or H respectively, for that element are reached by the measured amounts of base or highlight color respectively. The thresholds are assigned values corresponding to the level of measured base or highlight color amounts at which desired individual outputs are triggered to achieve the textured pattern which represents that particular combination of measured highlight and base color amounts.

In regions of the halftone cell 50 where the cell is not responsive to or controlled by the measured highlight color amount (i.e. in region 54' in FIG. 3A or outside region 52' in FIG. 3B), the highlight thresholds H are set so that no potentially measured highlight color amount possibly reaches the highlight threshold H. In this manner, because the highlight thresholds H can not possibly be reached, these regions are not responsive to the measured highlight color amount and are responsive solely to the measured base color amount. For example, as illustrated the H values for the column 2 and 3 elements $e_{i,2}$ and $e_{i,3}$ are set at 256 while the measure highlight color amount is limited to a range of values between 0 and 255. Therefore, the measured highlight color amount will not reach the set highlight thresholds H=256.

In a preferred embodiment, the regions of the halftone cell 50 which are responsive to both the measured highlight and base color amounts (i.e. region 52' in FIG. 3A and region 52" in FIG. 3B) employ ranges of highlight and base threshold values. These ranges are arranged such that for any two elements $e_{i,j}$ in the region, the one with the lower highlight threshold value has the higher base threshold value. That is to say, elements $e_{i,j}$ in the regions responsive to both the measure highlight and base color amounts have their highlight and base thresholds H and W set such that those elements having progressively lower base threshold values have progressively higher highlight threshold values. In this manner, loss of information due to the overlapping or dual control of the region is minimized by keeping the respective responsiveness of the individual elements $e_{i,j}$ to either controlling measure as separate as possible.

In the illustrated example, the base color is white and the highlight color is red. The textured pattern is generated as follows: the individual output for each element $e_{i,j}$ is white if either (1) the measured highlight color amount is greater than or equal to its highlight threshold H, or (2) the measured base color amount is greater than or equal to its base threshold W, otherwise it is black. In the case where the base color is black, the textured pattern is generated as follows: the individual output for each element $e_{i,j}$ is black if either (1) the measured highlight color amount is greater than or equal to its highlight threshold H, or (2) the measured base color amount is greater than or equal to its base threshold W, otherwise it is white.

With reference to FIG. 4 and continuing reference to the previously discussed figures, the output textured patterns for five examples of different colors are shown having the following amounts of highlight and base color amounts:

pink—a little red (a measured highlight color amount <125 ) and a lot of white (a measured base color amount between 128 and 156 );

strong red—a lot of red (a measured highlight color amount >210 ) and little to no white (a measured base color amount <15 );

dark gray—no red (a measured highlight color amount=0) and a little white (a measured base color amount between 43 and 71 );

light gray—no red (a measured highlight color amount=0) and a lot of white (a measured base color amount between 156 and 240 ); and, dark brown—a little red (a measured highlight color amount <125 ) and a little white (a measured base color amount between 43 and 71 ). Note, each color block is a combination of nine halftone cells 50. Moreover, the illustrated patterns are merely exemplary and different patterns as may be desired are possible by varying the shape and/or location of the halftone cell's regions of control and/or by varying the settings of the threshold values.

The invention has been described with reference to the preferred embodiments. Obviously, modifications and alterations will occur to others upon reading and understanding the proceeding detailed description. It is intended that the invention be construed as including all such modifications and alterations insofar as they come within the scope of the appended claims or the equivalents thereof.

Having thus described the preferred embodiments, the invention is now claimed to be:

1. A method for mapping highlight colors to monochromatic textures comprising:
   a) reading an input highlight color having a highlight color amount and a base color amount;
   b) measuring the highlight color amount and the base color amount;
   c) defining a halftone cell having a plurality of output regions with corresponding output states;
   d) controlling the output states of all the output regions in response to the measured base color amount; and,
   e) controlling the output state of at least one but less than all the output regions in response to the measured highlight color amount such that the output state of at least one but less than all the output regions is controlled by both the measured base color amount and the measured highlight color amount.

2. The method according to claim 1, wherein the halftone cell has a first output region and a second output region arranged such that the output states of both the first and second output regions are controlled in response to the measured base color amount and only the output state of the second output region is controlled in response to the measured highlight color amount.

3. The method according to claim 2, further comprising:
   dividing each output region into a threshold array having a plurality of elements with individual outputs;
   setting base thresholds and highlight thresholds for each element; and,
   determining the individual outputs of each element in response to the measured base and highlight color amounts as compared to the base and highlight thresholds respectively such that the individual outputs for the plurality of elements of each output region define the output state for each output region.

4. The method according to claim 3, wherein the individual outputs are binary.

5. The method according to claim 4, wherein the individual outputs are selected from a group consisting of black and white.

6. The method according to claim 3, wherein elements in output regions that do not have their output state controlled in response to the measured highlight color amount have their highlight thresholds set so that no measured highlight color amount possibly reaches their highlight thresholds.

7. The method according to claim 6, wherein the base thresholds are set such that the base thresholds of elements in output regions that do not have their output state controlled in response to the measured highlight color amount are reached by the measured base color amount prior to the measured base color amount reaching the base thresholds of elements in output regions that have their output state controlled in response to the measured highlight color amount.

8. The method according to claim 6, wherein in output regions that have their output state controlled in response to both the measured base and highlight color amounts, elements having progressively lower base threshold values have progressively higher highlight threshold values.

9. The method according to claim 2, further comprising:

determining what luminance the highlight color has; and, allocating which output regions have their output states controlled in response to the measured highlight color amount such that a fractional area of the halftone cell covered thereby is proportional to one of the luminance of the highlight color and its complement.

10. The method according to claim 2, wherein the base color is selected from a group consisting of black and white.

11. An image processing system comprising:

an image input terminal which reads an image portrayed in a highlight color scheme defined by two colors including a highlight color and a base color;

an image processing unit which (i) receives the image from the image input terminal, (ii) maps the highlight color scheme to a monochromatic textured scheme, and (iii) supplies the image portrayed in the monochromatic textured scheme, said image processing unit including;

detectors for detecting amounts of the highlight and base colors in the image; and, a halftoning processor which uses a halftone cell to control mapping in response to detected amounts of the highlight and base colors, said halftone cell having;

a first region responsive to detected amounts of the base color, said first region covering all of the halftone cell; and, a second region responsive to detected amounts of the highlight color, said second region overlapping the first region and covering a fraction of the halftone cell; and, an image output terminal which renders the image in the monochromatic textured scheme.

12. The image processing system according to claim 11, wherein the base color is selected from a group consisting of black and white.

13. The image processing system according to claim 12, wherein the highlight color has a luminance which luminance has a complement and the second region is arranged such that when the base color is white the fraction of the halftone cell covered by the second region is proportional to the luminance of the highlight color and when the base color is black the fraction of the halftone cell covered by the second region is proportional to the complement of the luminance of the highlight color.

14. The image processing system according to claim 11, wherein the halftone cell is divided into a threshold array having a plurality of elements, said elements each having a highlight threshold and a base threshold which the halftoning processor compares to the detected amounts of the highlight and base colors respectively to determine an output for each of the elements.

15. The image processing system according to claim 14, wherein elements inside the first region and outside the second region have highlight thresholds set higher than any possible detected amount of highlight color.

16. The image processing system according to claim 15, wherein elements inside the second region have base thresholds higher than the base thresholds of elements outside the second region.

17. The image processing system according to claim 15, wherein the highlight and base thresholds are set such that for any two elements inside the second region the element having the lower highlight threshold also has the higher base threshold.

* * * * *